(12) United States Patent
Dwyer et al.

(10) Patent No.: US 9,016,126 B2
(45) Date of Patent: Apr. 28, 2015

(54) MEMS ACCELEROMETER HAVING A FLUX CONCENTRATOR BETWEEN PARALLEL MAGNETS

(75) Inventors: Paul W. Dwyer, Seattle, WA (US); Steve Becka, North Bend, WA (US)

(73) Assignee: Honeywell International Inc., Morristown, NJ (US)

( * ) Notice: Subject to any disclaimer, the term of this patent is extended or adjusted under 35 U.S.C. 154(b) by 1654 days.

(21) Appl. No.: 12/349,681

(22) Filed: Jan. 7, 2009

(65) Prior Publication Data

US 2010/0170341 A1 Jul. 8, 2010

(51) Int. Cl.
*G01P 15/08* (2006.01)
*G01P 15/13* (2006.01)
*G01P 15/125* (2006.01)

(52) U.S. Cl.
CPC ........... *G01P 15/132* (2013.01); *G01P 15/0802* (2013.01); *G01P 15/125* (2013.01)

(58) Field of Classification Search
USPC ................ 73/514.31, 514.23, 514.17, 514.18
See application file for complete search history.

(56) References Cited

U.S. PATENT DOCUMENTS

| | | | | |
|---|---|---|---|---|
| 3,680,393 A | * | 8/1972 | Rogall | 73/514.23 |
| 3,702,073 A | * | 11/1972 | Jacobs | 73/514.32 |
| 3,863,508 A | * | 2/1975 | Scarborough et al. | 73/514.06 |
| 4,088,027 A | | 5/1978 | Hernandez et al. | |
| 4,398,418 A | * | 8/1983 | Shutt et al. | 73/514.17 |
| 4,498,342 A | * | 2/1985 | Aske | 73/514.23 |
| 4,510,802 A | | 4/1985 | Peters | |
| 4,649,748 A | * | 3/1987 | Fukano et al. | 73/514.19 |
| 4,779,463 A | * | 10/1988 | Woodruff | 73/497 |
| 4,854,169 A | * | 8/1989 | Sakuma et al. | 73/497 |
| 4,901,017 A | * | 2/1990 | Zinke | 324/239 |
| 4,926,122 A | * | 5/1990 | Schroeder et al. | 324/207.13 |
| 4,944,184 A | * | 7/1990 | Blake et al. | 73/514.23 |
| 5,060,039 A | | 10/1991 | Weinberg et al. | |
| 5,109,693 A | * | 5/1992 | Hojo et al. | 73/497 |
| 5,524,488 A | * | 6/1996 | Foote | 73/514.23 |
| 5,731,703 A | * | 3/1998 | Bernstein et al. | 324/256 |

(Continued)

FOREIGN PATENT DOCUMENTS

| | | |
|---|---|---|
| EP | 1754974 A2 | 2/2007 |
| JP | 6194383 A | 7/1994 |
| WO | 9524652 A1 | 9/1995 |

OTHER PUBLICATIONS

Office Action dated Dec. 6, 2013 from the counterpart Japanese patent application No. 2009-294607, and a translation of the same. 4 pages.

*Primary Examiner* — Helen Kwok
(74) *Attorney, Agent, or Firm* — Shumaker & Sieffert, P.A.

(57) ABSTRACT

Microelectromechanical (MEMS) accelerometer and acceleration sensing methods. An example MEMS accelerometer includes a housing, a proof mass suspended within the housing by at least one torsional flexure, at least one planar coil on the proof mass that extends on both sides of an axis of rotation of the proof mass, at least one magnet oriented such that a north-south axis of the at least one magnet is oriented approximately orthogonal to the rotational axis of the proof mass, at least one pole piece located outside the coil, and at least one magnetic flux concentrator located inside the coil opposite the at least one of the at least one pole pieces. A method includes sensing a change in capacitance of a pickoff in the MEMS accelerometer and rebalancing the MEMS accelerometer by sending a current through the planar coil between the magnetic flux concentrator and the pole piece.

17 Claims, 5 Drawing Sheets

(56) References Cited

U.S. PATENT DOCUMENTS

| | | |
|---|---|---|
| 5,739,431 A | 4/1998 | Petri |
| 6,664,786 B2 | 12/2003 | Kretschmann et al. |
| 6,776,042 B2 | 8/2004 | Pike et al. |
| 7,100,447 B2 * | 9/2006 | Dwyer ................ 73/514.23 |
| 7,303,935 B2 | 12/2007 | DeNatale et al. |
| 7,346,981 B2 | 3/2008 | Borwick, III et al. |
| 2010/0180681 A1 * | 7/2010 | Dwyer ................ 73/514.17 |

* cited by examiner

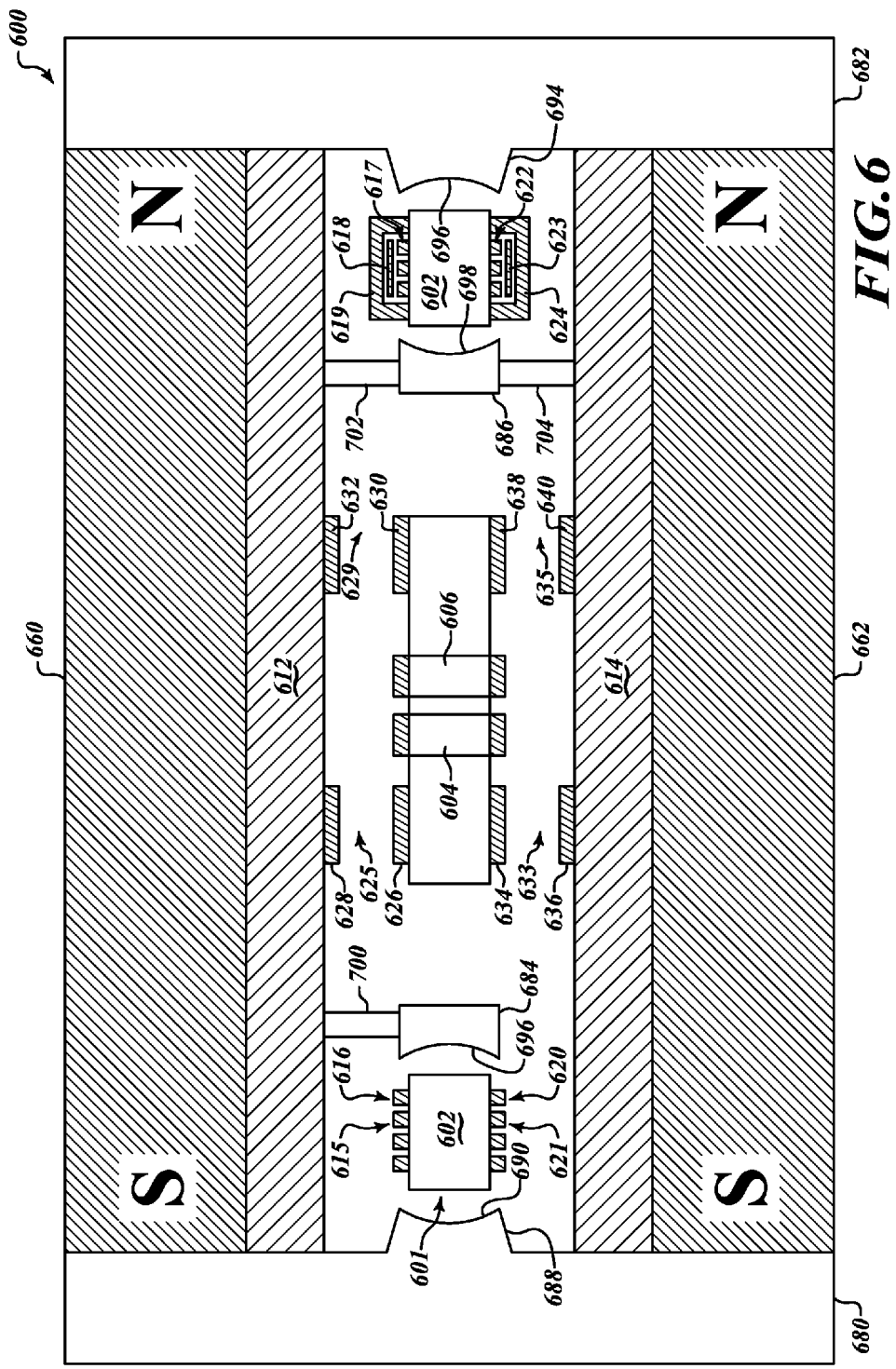

MEMS ACCELEROMETER HAVING A FLUX CONCENTRATOR BETWEEN PARALLEL MAGNETS

BACKGROUND OF THE INVENTION

Some force balance accelerometers use a magnetic rebalance by passing current through a torquing coil in the presence of a magnetic field. When subjected to vibration, these accelerometers may display a change in output unrelated to desired acceleration signals. One source of this output error is related to a change in servo forcing efficiency caused by magnetic flux variation in an area occupied by the forcing coil that moves in response to input vibration.

SUMMARY OF THE INVENTION

The present invention includes a microelectromechanical (MEMS) accelerometer and acceleration sensing methods. An example MEMS accelerometer includes a housing, a proof mass suspended within the housing by at least one torsional flexure, a coil on the proof mass, a first magnet positioned near a first side of the proof mass, at least one pole piece located outside the coil, and at least one magnetic flux concentrator located inside the coil opposite at least one of the at least one pole pieces. Pole pieces and magnetic flux concentrators are located to provide modified shielding around a set of magnets to produce an approximately uniform magnetic flux across the coil regardless of coil position. This more uniform magnetic flux reduces vibration rectification error in an example embodiment.

In accordance with one aspect of the invention, the accelerometer includes a second magnet positioned near a second side of the proof mass, a first pole piece located at a first end of the proof mass, and a second pole piece located at a second end of the proof mass. A first magnetic flux concentrator is located inside the coil opposite the first pole piece and a second magnetic flux concentrator is located inside the coil opposite the second pole piece.

In accordance with further aspects of the invention, the first magnetic flux concentrator includes a concave surface facing a concave surface of the first pole piece and the second magnetic flux concentrator includes a concave surface facing the concave surface of the second pole piece.

In accordance with other aspects of the invention, a method includes sensing a change in capacitance of a pickoff in the MEMS accelerometer and rebalancing the MEMS accelerometer by sending a current through the planar coil between the first magnetic flux concentrator and the first pole piece and also between the second magnetic flux concentrator and the second pole piece.

BRIEF DESCRIPTION OF THE DRAWINGS

Preferred and alternative embodiments of the present invention are described in detail below with reference to the following drawings:

FIG. 6 is a diagram of a cross-sectional side view of a MEMS accelerometer formed in accordance with an additional embodiment of the invention.

DETAILED DESCRIPTION OF THE INVENTION

Figure 1:
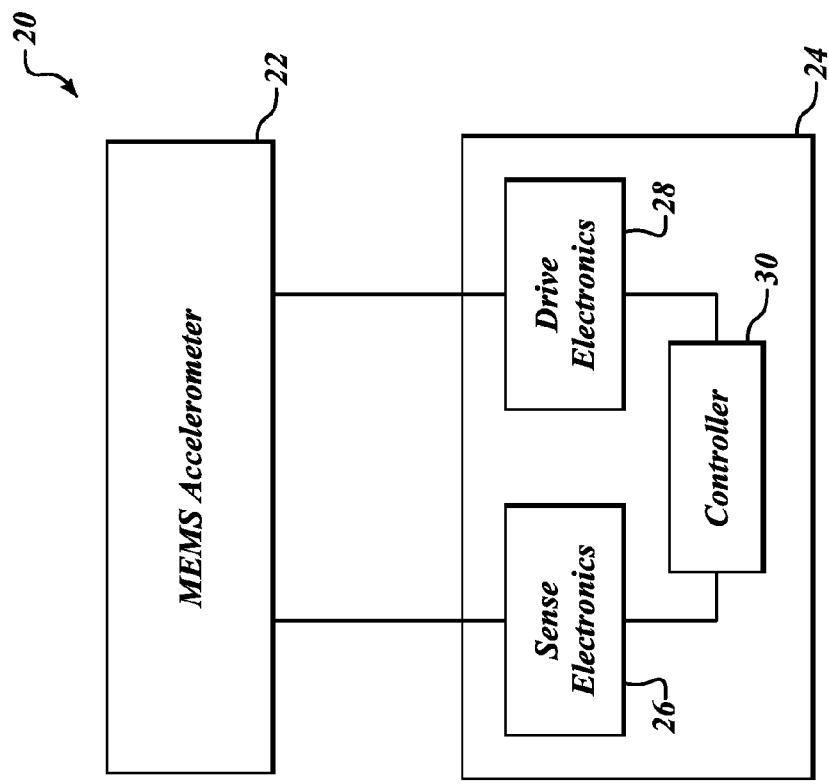
FIG. 1 is a block diagram of a microelectromechanical (MEMS) accelerometer system formed in accordance with an embodiment of the invention.

FIG. 1 is a block diagram of a microelectromechanical (MEMS) accelerometer system 20 formed in accordance with an embodiment of the invention. The MEMS accelerometer system 20 includes an accelerometer 22 and a control unit 24. The control unit 24 includes a sense electronics component 26 and a drive electronics component 28, both in signal communication with the MEMS accelerometer 22. The control unit 24 also includes a controller 30 in signal communication with the sense electronics component 26 and the drive electronics component 28. Generally, the accelerometer 22 includes a proof mass suspended by at least one torsional flexure within a housing and a torsional magnetic rebalancing component for rebalancing the proof mass about the at least one torsional flexure. In an example embodiment, the torsional magnetic rebalancing component makes use of the Lorentz force by passing a current through a coil that lies on both sides of a rotational axis of the proof mass within a magnetic flux field so that D'Arsonval type movement about the rotational axis is used to rebalance the accelerometer 22. Pole pieces are positioned outside of the coil loop across from magnetic flux concentrators located inside the coil loop to provide increased magnetic flux field linearity across the coil. The pole pieces and magnetic flux concentrators are formed of a magnetically permeable material. In an example embodiment, the pole pieces and magnetic flux concentrators are formed of alloy 39. Additional detail for example embodiments of the accelerometer 22 is discussed with respect to FIGS. 2-5.

Figure 2:
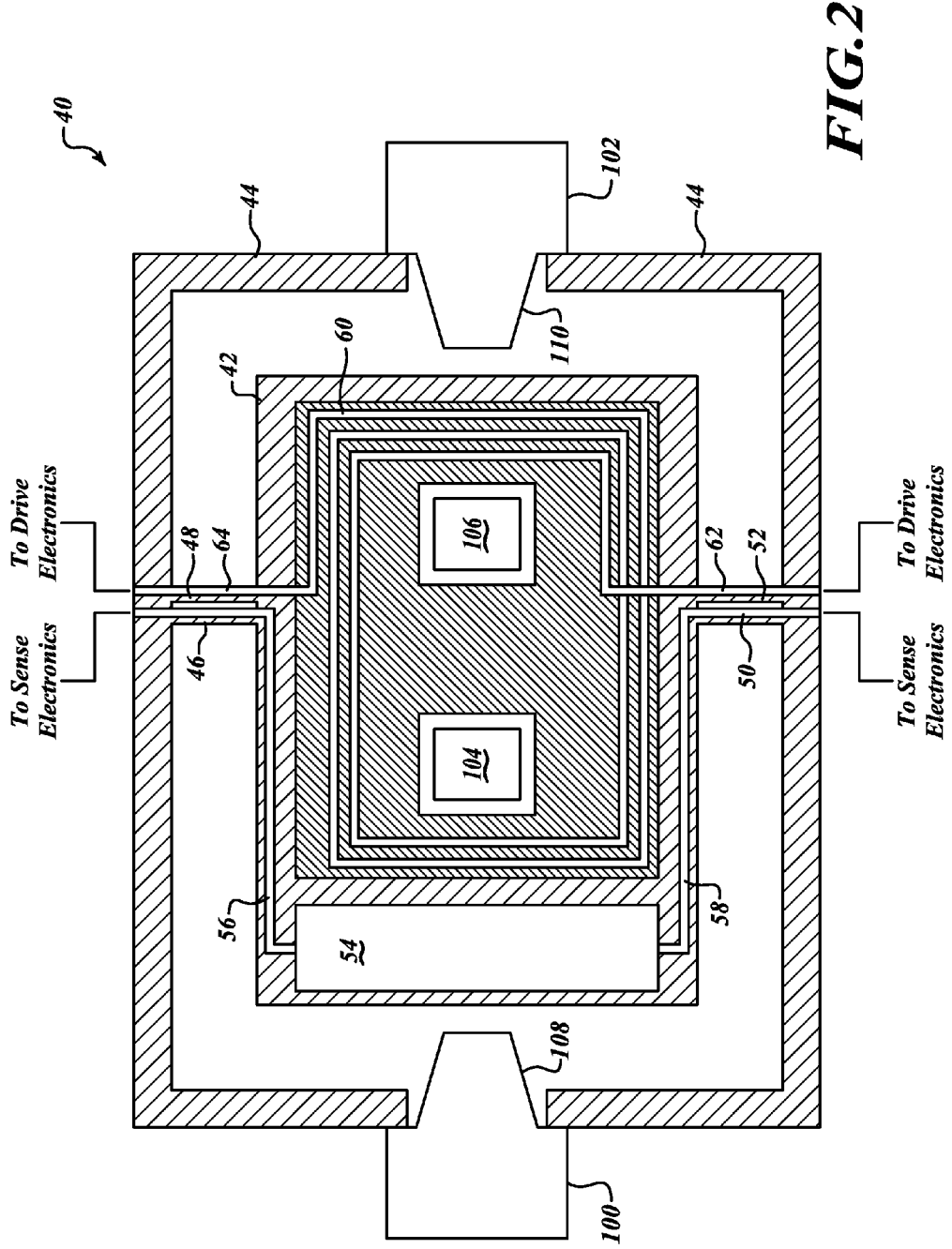
FIG. 2 is a diagram of a top partial x-ray view of a MEMS accelerometer formed in accordance with an additional embodiment of the invention.

FIG. 2 is a diagram of a top partial x-ray view of a MEMS accelerometer 40 formed in accordance with an embodiment of the invention. The accelerometer 40 may be used in place of the accelerometer 22 in the accelerometer system 20 in some embodiments. The accelerometer 40 includes a proof mass 42 suspended within a housing 44 by a first torsional flexure 46, a second torsional flexure 48, a third torsional flexure 50, and a fourth torsional flexure 52. The torsional flexures 46-52 allow the proof mass 42 to rotate about a rotational axis that is parallel with the flexures 46-52. The proof mass 42 is structured to include a mass imbalance between one side of the rotational axis and the other side of the rotational axis. In the example shown, the rotational axis is positioned such that a greater portion of the proof mass lies to one side of the rotational axis. However, in other embodiments, the mass imbalance may be created in other ways, such as by forming holes or cavities in one side of the proof mass, for example.

A first capacitive pickoff having a first pad 54 is positioned at a first end of a first side of the proof mass 42. A first conductive trace 56 connects the pad 54 to sense electronics, such as the sense electronics component 26 shown in FIG. 1, over the first torsional flexure 46. A second pad (not shown) for the first capacitive pickoff is attached to an inner surface of a portion (not shown) of the housing 44 that is positioned above the proof mass 42. A second conductive pickoff trace 58 runs across the third torsional flexure 50 to a second capacitive pickoff (not visible behind the first pickoff) on a second side of the proof mass 42. The use of a capacitive pickoff on each side of the same end of the proof mass 42 allows differential measurements to be taken. Additional capacitive pickoffs located on the second side of the proof mass 42, and/or on the other end of the proof mass 42 on the other side of the rotational axis may also be present in some embodiments.

A planar coil 60 is located on the first side of the proof mass 42 and extends on both sides of the rotational axis of the proof mass 42. The coil 60 is a single layer spiral coil in an example embodiment. In an example embodiment, the coil 60 includes approximately 10 turns that are each approximately 45 micrometers (microns) wide, with a spacing of approximately 15 microns between turns and a thickness of approximately 0.5 microns. However, different numbers of turns, widths, spacing, and thicknesses for the coil 60 may also be used. The coil 60 is connected to drive electronics, such as the drive electronics component 28 shown in FIG. 1, by a first conductive coil trace 62 and a second conductive coil trace 64 that run over the second torsional flexure 48 and the fourth torsional flexure 52, respectively. In other example embodiments, the traces that run to the coil 60 are routed over the top and bottom of a single flexure to achieve a common mode effect. This may help to reduce bending effects related to temperature based on differing expansion coefficients for the flexure material and the conductive trace material. Although only a single coil 60 is shown for clarity, additional coils may also be used, such as a second coil located on a second side of the proof mass 42.

A first magnet (not shown) on a first side of the proof mass is positioned such that a north-south axis of the first magnet is oriented approximately orthogonal to the rotational axis of the proof mass. Additional magnets may also be used, such as a second magnet located on a second side of the proof mass 42 that is oriented in similar fashion to the first magnet. In an example embodiment, the first and second magnets are positioned such that a south pole of the first magnet is above at least a portion of a first pole piece 100 and a north pole of the first magnet is above at least a portion of a second pole piece 102. The second magnet is oriented in similar fashion, but below the first pole piece 100 and the second pole piece 102.

The first pole piece 100 is located outside the coil 60 at the first end of the proof mass 42 and the second pole piece 102 is located outside the coil 60 at the second end of the proof mass. A first magnetic flux concentrator 104 is positioned inside the coil 60 across from the first pole piece 100 and a second magnetic flux concentrator 106 is positioned inside the coil 60 across from the second pole piece 102. In an example embodiment, the first pole piece 100 includes a tab 108 that projects toward the coil 60 and the second pole piece 102 includes a tab 110 that projects toward the coil 60. The pole pieces 100, 102 and the magnetic flux concentrators 104, 106 are shaped and positioned such that a magnetic flux field across the coil 60 between the pole pieces 100, 102 and the magnetic flux concentrators 104, 106 respectively is approximately linear. The magnetic flux concentrators 104, 106 are suspended within holes defined by the proof mass 42. In an example embodiment, the holes extend all the way through the proof mass 42 and the magnetic flux concentrators 104, 106 are held in place by support structures that extend to an upper portion (not shown) of a housing and a lower portion (not shown) of a housing.

Figure 3:
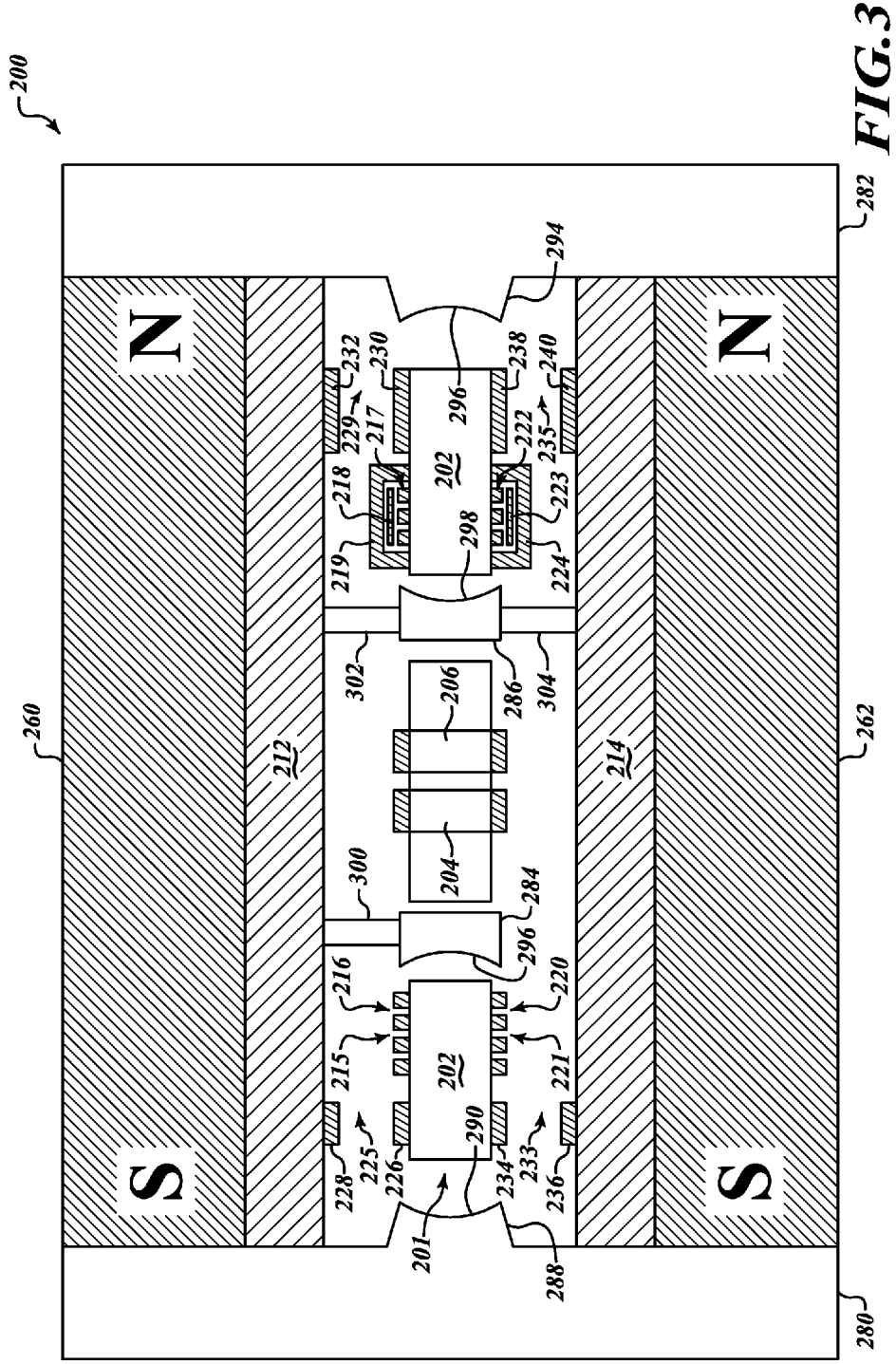
FIG. 3 is a diagram of a cross-sectional side view of a MEMS accelerometer formed in accordance with an example embodiment of the invention.

FIG. 3 is a diagram of a cross-sectional side view of a MEMS accelerometer 200 formed in accordance with an example embodiment of the invention. The MEMS accelerometer 200 is similar to the accelerometer 40 shown in FIG. 2, but also shows second pads of the capacitive pickoffs on an interior of a housing and an additional coil on a second side of the proof mass. The accelerometer 200 may be used in place of the accelerometer 22 in the accelerometer system 20 shown in FIG. 1 in some embodiments.

The accelerometer 200 includes a wafer device layer 201 having a proof mass 202 suspended by a first torsional flexure 204 and a second torsional flexure 206. The wafer device layer 201 includes an outer hoop (not shown) that is sandwiched between a housing that includes a first housing component 212 and a second housing component 214. The proof mass 202 is suspended within the housing inside the outer hoop by the first and second flexures 204, 206. The first and second torsional flexures 204, 206 connect to another portion (not shown) of the outer hoop in the wafer device layer 201. Additional torsional flexures (not shown) may also be present on another portion (not shown) of the proof mass 202.

A planar first coil 215 is on a first side of the proof mass 202. The first coil 215 extends on a first side 216 and a second side 217 of a rotational axis of the proof mass 202 about the flexures 204, 206. An insulating layer 218 extends across a portion of the first coil 215 so that a conductive trace 219 is able to connect an inner portion of the first coil 215 to external components (not shown), such as the drive electronics 28 shown in FIG. 1, for example. In similar fashion to the first coil 215, a planar second coil 220 is on a second side of the proof mass 202. The second coil 220 extends on a first side 221 and a second side 222 of the rotational axis of the proof mass 202. An insulating layer 223 extends across a portion of the second coil 220 so that a conductive trace 224 is able to connect an inner portion of the second coil 220 to external components (not shown), such as the drive electronics 28.

A first capacitive pickoff 225 is located on a first end of the first side of the proof mass 202. The first capacitive pickoff 225 includes a first pad 226 on the proof mass 202 and a second pad 228 on an inner surface of the first housing component 212 opposite the first pad 226. A second capacitive pickoff 229 is located on a second end of the first side of the proof mass 202. The second capacitive pickoff 229 includes a third pad 230 on the proof mass 202 and a fourth pad 232 on an inner surface of the first housing component 212 opposite the third pad 230. A third capacitive pickoff 233 is located on a first end of the second side of the proof mass 202. The third capacitive pickoff 233 includes a fifth pad 234 on the proof mass 202 and a sixth pad 236 on an inner surface of the second housing component 214 opposite the fifth pad 234. A fourth capacitive pickoff 235 is located on a second end of the second side of the proof mass 202. The fourth capacitive pickoff 235 includes a seventh pad 238 on the proof mass 202 and an eighth pad 240 on an inner surface of the second housing component 214 opposite the seventh pad 238. In an example embodiment, the first and fourth capacitive pickoffs 225, 235 are connected and the second and third capacitive pickoffs 229, 233 are connected to counteract a proof mass sag effect.

A first magnet 260 is positioned such that a north-south axis of the magnet 260 is oriented approximately orthogonal to the rotational axis of the proof mass 202. A second magnet 262 located on the second side of the proof mass 202 is oriented in similar fashion to the magnet 260, with a north-south axis of the magnet 262 oriented approximately orthogonal to the rotational axis of the proof mass 202. In an example embodiment, the first and second magnets 260, 262 are arranged such that they are parallel with each other.

For a particular geometry of parallel magnets, a characteristic variation of the flux density occurs in both the X (along the length) and Y (perpendicular to the long axis of the magnets) axes. Finite element analysis of the configuration of magnets can aid in showing what the flux gradients look like. A shield composed of magnetically permeable material is placed outside the two parallel magnets, largely enclosing them and drawing some of the flux generated by the magnetomotive force (mmf) of the magnet pair. The amount and distribution of the flux is driven by the shape and proximity of the shield to the magnet pair. A preferred methodology for modifying the magnetic field is to capture several instances where the shield geometry has been modified and analyze the curvature coefficients defining the field distributions thus created. These comparisons result in a direction vector to modify the shield geometry to achieve a desired field distribution. In the case of a torsion-mode flexured accelerometer such as the accelerometer 200, a desirable state is one where the curvature coefficients in the Y axis at locations where the coil current and the flux interact is as close to zero as possible. The shielding may include pole pieces and magnetic flux concentrators in an example embodiment.

A first pole piece 280 is located adjacent to south poles of the magnets 260, 262 and a second pole piece 282 is located adjacent to north poles of the magnets 260, 262. The pole pieces 280, 282 are located external to the coils 215 and 220 across from a first magnetic flux concentrator 284 and a second magnetic flux concentrator 286, respectively that are located on an inside of the coils 215, 220. The first pole piece 280 has a tab 288 with a concave face 290 that is oriented toward a corresponding concave face 292 of the first magnetic flux concentrator 284. In similar fashion, the second pole piece 282 has a tab 294 with a concave face 296 that is oriented toward a corresponding concave face 298 of the second pole piece 286. The first magnetic flux concentrator 284 is suspended by a first support structure 300 attached to the first housing component 212. The second magnetic flux concentrator 298 is suspended by a second support structure 302 attached to the first housing component 212 and a third support structure 304 attached to the second housing component 214. The support structures 300, 302, 304 are a magnetically non-permeable material, such as Pyrex®, in an example embodiment.

Figure 5:
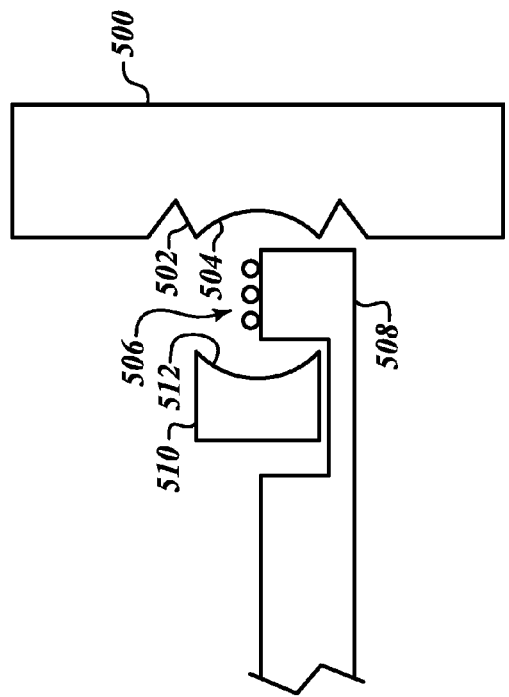
FIGS. 4-5 are diagrams of cross-sectional side views of pole pieces and magnetic flux concentrators formed in accordance with other embodiments of the invention.
Figure 4:
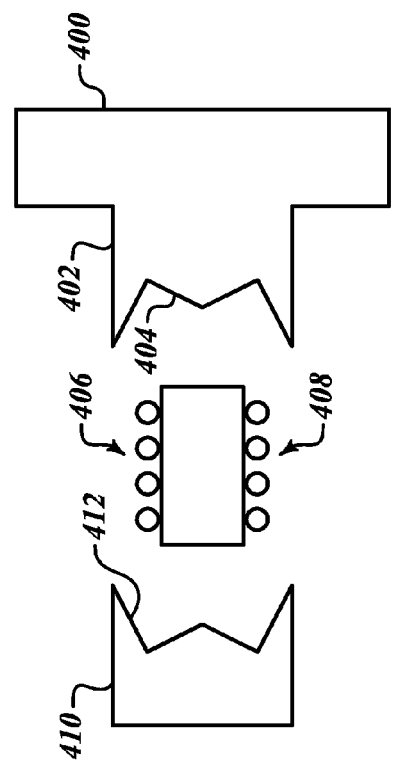

FIGS. 4-5 are diagrams of cross-sectional side views of pole pieces and magnetic flux concentrators formed in accordance with other embodiments of the invention. FIG. 4 shows a pole piece 400 having a tab 402 projecting from the pole piece 400. The tab 402 has a surface 404 with a W-shaped cross-section. The pole piece 400 is located outside a first coil 406 and a second coil 408. A magnetic flux concentrator 410 is located on an inside of the coils 406, 408. The magnetic flux concentrator 410 has a surface 412 with a W-shaped cross-section that faces the surface 404 of the pole piece 400. In an example embodiment, the W-shaped cross-sections have a spline fit topography.

FIG. 5 shows a pole piece 500 having a tab 502. The tab 502 does not project from the pole piece 500, but is a distinct portion of the pole piece 500 separated from other portions of the pole piece 500 by recesses defined by the pole piece 500. The tab 502 includes a concave surface 504. The pole piece 500 is located outside a coil 506 that is on the surface of a proof mass 508. A magnetic flux concentrator 510 is located on an inside of the coil 506. The magnetic flux concentrator 510 has a concave surface 512 that faces the concave surface 504 of the pole piece 500. The magnetic flux concentrator 510 is positioned in a recess defined by the proof mass 508. In contrast to the holes that pass all the way through the proof mass 202 shown in FIG. 3, the recess in the proof mass 508 extends only partially through the proof mass 508.

FIGS. 4 and 5 do not show all parts of the accelerometers in which the pole pieces and magnetic flux concentrators would be located for clarity. However, it should be understood that they would be located in an accelerometer such as the accelerometer 40 or 200 shown in FIGS. 2 and 3. It should also be understood that a corresponding second pole piece and second magnetic flux concentrator would also be present.

FIG. 6 is a diagram of a cross-sectional side view of a MEMS accelerometer 600 formed in accordance with an example embodiment of the invention. The MEMS accelerometer 600 is similar to the accelerometer 200 shown in FIG. 3, but includes capacitive pickoffs located inside the coil and in a region that is not between a pole piece and a magnetic flux concentrator. This allows the pole piece and magnetic flux concentrator to be spaced more closely, decreasing the reluctance of the magnetic field across the coil. The accelerometer 600 may be used in place of the accelerometer 22 in the accelerometer system 20 shown in FIG. 1 in some embodiments.

The accelerometer 600 includes a wafer device layer 601 having a proof mass 602 suspended by a first torsional flexure 604 and a second torsional flexure 606. The wafer device layer 601 includes an outer hoop (not shown) that is sandwiched between a housing that includes a first housing component 612 and a second housing component 614. The proof mass 602 is suspended within the housing inside the outer hoop by the first and second flexures 604, 606. The first and second torsional flexures 604, 606 connect to another portion (not shown) of the outer hoop in the the wafer device layer 601. Additional torsional flexures (not shown) may also be present on another portion (not shown) of the proof mass 602.

A planar first coil 615 is on a first side of the proof mass 602. The first coil 615 extends on a first side 616 and a second side 617 of a rotational axis of the proof mass 602 about the flexures 604, 606. An insulating layer 618 extends across a portion of the first coil 615 so that a conductive trace 619 is able to connect an inner portion of the first coil 615 to external components (not shown), such as the drive electronics 28 shown in FIG. 1, for example. In similar fashion to the first coil 615, a planar second coil 620 is on a second side of the proof mass 602. The second coil 620 extends on a first side 621 and a second side 622 of the rotational axis of the proof mass 602. An insulating layer 623 extends across a portion of the second coil 620 so that a conductive trace 624 is able to connect an inner portion of the second coil 620 to external components (not shown), such as the drive electronics 28.

A first capacitive pickoff 625 is located on a first side of the flexures 604, 606 on the first side of the proof mass 602. The first capacitive pickoff 625 includes a first pad 626 on the proof mass 602 and a second pad 628 on an inner surface of the first housing component 612 opposite the first pad 626. A second capacitive pickoff 629 is located on a second side of the flexures 604, 606 on the first side of the proof mass 602. The second capacitive pickoff 629 includes a third pad 630 on the proof mass 602 and a fourth pad 632 on an inner surface of the first housing component 612 opposite the third pad 630. A third capacitive pickoff 633 is located on the first side of the flexures 604, 606 on the second side of the proof mass 602. The third capacitive pickoff 633 includes a fifth pad 634 on the proof mass 602 and a sixth pad 636 on an inner surface of the second housing component 614 opposite the fifth pad 634. A fourth capacitive pickoff 635 is located on the second side of the flexures 604, 606 on the second side of the proof mass 602. The fourth capacitive pickoff 635 includes a seventh pad 638 on the proof mass 602 and an eighth pad 640 on an inner surface of the second housing component 614 opposite the seventh pad 638. In an example embodiment, the first and fourth capacitive pickoffs 625, 635 are connected and the second and third capacitive pickoffs 629, 633 are connected to counteract a proof mass sag effect.

A first magnet 660 is positioned such that a north-south axis of the magnet 660 is oriented approximately orthogonal to the rotational axis of the proof mass 602. A second magnet 662 located on the second side of the proof mass 602 is oriented in similar fashion to the magnet 660, with a north-south axis of the magnet 662 oriented approximately orthogonal to the rotational axis of the proof mass 602. In an example embodiment, the first and second magnets 660, 662 are arranged such that they are parallel with each other.

For a particular geometry of parallel magnets, a characteristic variation of the flux density occurs in both the X (along the length) and Y (perpendicular to the long axis of the magnets) axes. Finite element analysis of the configuration of magnets can aid in showing what the flux gradients look like. A shield composed of magnetically permeable material is placed outside the two parallel magnets, largely enclosing them and drawing some of the flux generated by the magnetomotive force (mmf) of the magnet pair. The amount and distribution of the flux is driven by the shape and proximity of the shield to the magnet pair. A preferred methodology for modifying the magnetic field is to capture several instances where the shield geometry has been modified and analyze the curvature coefficients defining the field distributions thus created. These comparisons result in a direction vector to modify the shield geometry to achieve a desired field distribution. In the case of a torsion-mode flexured accelerometer such as the accelerometer 600, a desirable state is one where the curvature coefficients in the Y axis at locations where the coil current and the flux interact is as close to zero as possible. The shielding may include pole pieces and magnetic flux concentrators in an example embodiment.

A first pole piece 680 is located adjacent to south poles of the magnets 660, 662 and a second pole piece 682 is located adjacent to north poles of the magnets 660, 662. The pole pieces 680, 682 are located external to the coils 615 and 620 across from a first magnetic flux concentrator 684 and a second magnetic flux concentrator 686, respectively that are located on an inside of the coils 615, 620. The first magnetic flux concentrator 684 and the second magnetic flux concentrator 686 are located outside of the first, second, third, and fourth pickoffs 625, 629, 633, and 635 in an example embodiment. The first pole piece 680 has a tab 688 with a concave face 690 that is oriented toward a corresponding concave face 692 of the first magnetic flux concentrator 684. In similar fashion, the second pole piece 682 has a tab 694 with a concave face 696 that is oriented toward a corresponding concave face 698 of the second pole piece 686. The first magnetic flux concentrator 684 is suspended by a first support structure 700 attached to the first housing component 612. The second magnetic flux concentrator 698 is suspended by a second support structure 702 attached to the first housing component 612 and a third support structure 704 attached to the second housing component 614. The support structures 700, 702, 704 are a magnetically non-permeable material, such as Pyrex®, in an example embodiment. It should be understood that other shapes of pole pieces and magnetic flux concentrators such as those shown in FIGS. 4 and 5 may also be used.

Generally, the accelerometers 22, 40, 200, and 600 are formed by starting with a silicon wafer that is patterned and etched to produce several pendulous proof mass elements with torsional flexures attached to support structures. The wafer is then oxidized to produce a dielectric layer to support metallization. Further patterning and metallization steps create differential capacitive pickoffs and the basic element for a spiral coil. The inner trace of the coil is brought out via the placement of a dielectric layer across the spiral coil, followed by a second metallization step. Glass wafers with the same diameter as the silicon wafer are patterned, etched, and metallized to produce recesses in the surface that act as second plates of the differential capacitive pickoffs and further serve to control device damping. A first glass wafer is then aligned with the silicon wafer and anodically bonded to form the lower capacitor plates. This assembly is then anodically bonded to a second glass wafer to form the upper capacitors for the differential capacitive pickoff. Magnets are attached to the upper and lower glass plates to create a magnetic field with which the spiral coil interacts. The wafer assembly is then diced so that individual accelerometers can be accessed for packaging, testing, and incorporation into an accelerometer system.

In an example embodiment, the accelerometers 22, 40, 200, and 600 of FIGS. 1-3 and 6 are formed by oxidizing a pattern and deep reactive ion etching (DRIE) a proof mass and torsional flexures on a silicon wafer. Next, a spiral coil and pickoffs are metallized on the proof mass. The spiral coil and pickoffs may be formed of gold, for example. Then, an insulating layer is sputtered across a portion of the coils. Next, an additional trace is metallized across the insulating layer to bring a connection to an inner part of the coils. Then, a first housing portion that may be made of a glass such as borosilicate Pyrex®, for example, is etched to produce recesses for capacitors and through holes for access to traces on the proof mass. Then, the first housing portion is metallized to form a portion of the capacitive pickoffs. In similar fashion, a second housing portion is etched and metallized. The first and second housing portions are attached to the wafer layer that includes the proof mass, such as by anodically bonding the housing portions to the wafer layer. Then, magnets are mounted to the first and second portions of the housing on either side of the proof mass. Mounting the magnets after the first and second housing components have been attached to the wafer device layer seals the device from particulate contamination that could otherwise occur during attachment of the magnets.

In an example embodiment, the accelerometers 22, 40, 200, and 600 are also formed by including through-holes through the glass housing layers that may be made of Pyrex®, for example that have anodically bonded sealed sidewalls. A first magnet is prepared by bonding glass standoffs that may be made of Pyrex®, for example, to the magnet and magnetic flux concentrators to the standoffs on the magnet to form a first magnet/flux concentrator assembly. The glass-silicon-glass wafer stack with through-holes is then diced into individual devices. Each die is then placed onto the first magnet/flux concentrator assembly so that the flux concentrators are properly aligned. The first magnet/flux concentrator assembly is then bonded to the die. A second magnet is then aligned and bonded to the die that includes the first magnet/flux concentrator assembly. External pole pieces are then aligned and bonded. Some embodiments also include glass standoffs bonding the second magnet to the internal flux concentrators for improved symmetry and structural integrity.

While the preferred embodiment of the invention has been illustrated and described, as noted above, many changes can be made without departing from the spirit and scope of the invention. For example, pole pieces and magnetic flux concentrators having a surface with a shape other than a W-shaped or concave cross-section may be used. Different coil configurations and pickoff pad configurations may also be used. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A microelectromechanical (MEMS) accelerometer comprising:
    a housing;
    a proof mass suspended within the housing by at least one torsional flexure;
    a coil on the proof mass;
    a first magnet positioned near a first side of the proof mass;
    at least one pole piece located outside the coil; and
    at least one magnetic flux concentrator located inside the coil opposite at least one of the at least one pole piece,
    wherein the first magnet is not located inside the coil.

2. The MEMS accelerometer of claim 1, further comprising a second magnet positioned near a second side of the proof mass.

3. The MEMS accelerometer of claim 2, wherein the at least one pole piece includes a first pole piece located at a first end of the proof mass and a second pole piece located at a second end of the proof mass, and wherein the at least one magnetic flux concentrator includes a first magnetic flux concentrator located inside the coil opposite the first pole piece and a second magnetic flux concentrator located inside the coil opposite the second pole piece.

4. The MEMS accelerometer of claim 3, wherein:
    the first pole piece has a first shape and the first magnetic flux concentrator has a second shape, with the first and second shapes configured to produce an approximately linear magnetic flux field between the first pole piece and the first magnetic flux concentrator such that an approximately uniform flux field is present across the coil between the first pole piece and the first magnetic flux concentrator regardless of coil position; and
    the second pole piece has a third shape and the second magnetic flux concentrator has a fourth shape, with the third and fourth shapes configured to produce an approximately linear magnetic flux field between the second pole piece and the second magnetic flux concentrator such that an approximately uniform flux field is present across the coil between the second pole piece and the second magnetic concentrator regardless of coil position.

5. The MEMS accelerometer of claim 3, wherein the first pole piece includes a concave surface facing the coil and the second pole piece includes a concave surface facing the coil.

6. The MEMS accelerometer of claim 5, wherein the first magnetic flux concentrator includes a concave surface facing the concave surface of the first pole piece and the second magnetic flux concentrator includes a concave surface facing the concave surface of the second pole piece.

7. The MEMS accelerometer of claim 3, wherein the first pole piece includes a surface having a W-shaped cross-section facing the coil and the second pole piece includes a surface having a W-shaped cross-section facing the coil and wherein the first magnetic flux concentrator includes a surface having a W-shaped cross-section facing the W-shaped surface of the first pole piece and the second magnetic flux concentrator includes a surface having a W-shaped cross-section facing the W-shaped surface of the second pole piece.

8. The MEMS accelerometer of claim 3, wherein the first magnet is parallel to the second magnet.

9. The MEMS accelerometer of claim 3, wherein the first and second magnets are located outside the housing.

10. The MEMS accelerometer of claim 3, wherein the proof mass defines a first recess and a second recess, the first magnetic flux concentrator located in the first recess and the second magnetic flux concentrator located in the second recess, the first and second recesses not extending all the way through the proof mass.

11. The MEMS accelerometer of claim 3, wherein the proof mass defines a first hole and a second hole, the first magnetic flux concentrator located in the first hole and the second magnetic flux concentrator located in the second hole, the first and second holes extending all the way through the proof mass.

12. The MEMS accelerometer of claim 3, wherein the first and second magnetic flux concentrators are formed of a magnetically permeable material.

13. The MEMS accelerometer of claim 12, wherein the magnetically permeable material includes Alloy 39.

14. The MEMS accelerometer of claim 3, wherein a first magnetic flux field between the first pole piece and the first magnetic flux concentrator is approximately linear and a second magnetic flux field between the second pole piece and the second magnetic flux concentrator is approximately linear.

15. The MEMS accelerometer of claim 3, further comprising at least one capacitive pickoff, wherein at least one of the at least one capacitive pickoff is located between the first magnetic flux concentrator and the second magnetic flux concentrator.

16. The MEMS accelerometer of claim 15, wherein the at least one capacitive pickoff comprises a plurality of capacitive pickoffs, wherein all of the capacitive pickoffs are located between the first magnetic flux concentrator and the second magnetic flux concentrator.

17. A method of sensing acceleration with a MEMS accelerometer that includes a proof mass having an axis of rotation about at least one flexure, a coil on the proof mass positioned such that the coil extends on both sides of the axis of rotation, at least one magnet, at least one pole piece, and at least one magnetic flux concentrator, the at least one magnet, the pole piece, and the magnetic flux concentrator positioned such that a magnetic flux field flows approximately orthogonally to the axis of rotation across the coil between the pole piece and the magnetic flux concentrator, the at least one magnet not being located between the coil, the method comprising:
    sensing a change in capacitance of a pickoff in the MEMS accelerometer; and
    rebalancing the MEMS accelerometer by sending a current through the coil between the at least one pole piece and the at least one magnetic flux concentrator.

* * * * *